Patented July 24, 1934

1,967,263

UNITED STATES PATENT OFFICE 1,967,263

RECOVERY OF SULPHUR

Ludwig Rosenstein, San Francisco, Calif., assignor to United Verde Copper Company, a corporation of Delaware No Drawing. Application November 28, 1930, Serial No. 498,752

12 Claims. (Cl. 23—226)

This invention relates to sulphur recovery and has for an object the provision of an improved process for recovering elemental sulphur from gases containing sulphur dioxide. More particularly, the invention contemplates the provision of an improved process for recovering sulphur involving the use of hydrocarbons as reducing agents.

Efforts have been made in the past to recover elemental sulphur from gases containing sulphur dioxide by reducing the sulphur dioxide with hydrocarbons of various types. According to the processes which have been proposed heretofore, the gases containing sulphur dioxide are subjected to the action of hydrocarbons under conditions designed to effect a conversion or reduction of substantially all of the sulphur dioxide to elemental sulphur. The reactions involved in such processes do not proceed smoothly or to completion, and appreciable amounts of hydrogen sulphide and carbonyl sulphide (COS) are produced. The production of such compounds results in economic inefficiency and complicates the recovery of the elemental sulphur produced.

I have discovered that the problem of recovering elemental sulphur from gases containing sulphur dioxide can be simplified chemically and mechanically by treating a portion of the gases with a hydrocarbon under such conditions as to produce hydrogen sulphide and subjecting another portion of the gases to the action of the hydrogen sulphide thus produced to effect a reaction between the hydrogen sulphide and the sulphur dioxide contained in the gases and produce elemental sulphur.

I have found that when gases containing sulphur dioxide are subjected to the action of a hydrocarbon in adequate proportion at an elevated temperature in the presence of a suitable catalyst, a reaction between the sulphur dioxide and the hydrocarbon producing hydrogen sulphide proceeds smoothly and to substantial completion. The gases containing the hydrogen sulphide produced may then be mixed with an additional quantity of the gases containing sulphur dioxide, air or other suitable oxidizing agent to oxidize the hydrogen sulphide and produce elemental sulphur.

A preferred complete process of the invention involves the treatment of gases containing sulphur dioxide with a hydrocarbon under such conditions as to effect a substantially complete conversion or reduction of the sulphur dioxide to hydrogen sulphide, and treatment of the resulting hydrogen sulphide with an oxidizing agent to produce elemental sulphur.

In order that a substantially complete conversion or reduction of the sulphur dioxide to hydrogen sulphide may be effected, the hydrocarbon should be supplied in such amount that the total hydrogen will be at least sufficient to combine with all the sulphur of the sulphur dioxide to form hydrogen sulphide, and the total carbon will be at least sufficient to combine with all the oxygen of the sulphur dioxide to form carbon dioxide. During the course of the reducing operation, small amounts of the sulphur dioxide may be reduced only to elemental sulphur with the result that some elemental sulphur will be present in the gaseous reduction product, but, when the operation is conducted under suitable conditions, the major portion of the sulphur dioxide will be reduced to hydrogen sulphide. The appearance of elemental sulphur in the gaseous reduction product will result largely from failure to supply an adequate amount of hydrocarbon, the allowance of insufficient time to complete the reduction, or failure to bring the reacting gases into a suitable reacting relationship. If for any reason it is desirable to obtain a gaseous reduction product containing some elemental sulphur, the desired result may be achieved by controlling the operation to establish any or all of the aforementioned conditions.

The sulphur dioxide employed in carrying out the process may be obtained from any suitable source. The gases obtained in roasting or smelting sulphide ores provide a suitable source from which sulphur dioxide may be obtained cheaply and conveniently, and the process is admirably adapted for use in conjunction with such smelting and roasting operations. The use of the process in conjunction with a process involving the smelting or roasting of sulphide ores permits the economical recovery of a product which is normally wasted, and, at the same time, provides for the elimination of the nuisance effect of smelter gases. When the process of the invention is conducted in conjunction with a smelting or roasting operation as a result of which large quantities of sulphur dioxide are produced it is advisable to employ sulphur dioxide as the oxidizing agent for the hydrogen sulphide produced. Under such circumstances, a portion of the available sulphur dioxide is treated to produce hydrogen sulphide and another portion is used to oxidize the hydrogen sulphide produced.

The use of sulphur dioxide from the smelter gases eliminates the necessity for obtaining and employing an oxidizing agent of another type and permits the utilization of the full reducing power of the hydrogen sulphide to achieve the production of elemental sulphur.

The sulphur dioxide employed in carrying out the process may be mixed with the usual products of combustion which are present in roaster or smelter gases or, when roaster or smelter gases are employed as the source of sulphur dioxide, a relatively pure sulphur dioxide gas may be first produced by any of the usual methods.

Suitable catalysts for promoting the reaction between the sulphur dioxide and the hydrocarbon include a number of metal sulphides such as manganese sulphide and sulphides of the alkaline-earth metals which may be used singly or mixed with one another in any desired proportions. I have found that metal sulphide catalysts of optimum efficiency are obtained by employing sulphides obtained by reducing the sulphates of the metals. The reduction of the metal sulphates may be conducted prior to the commencement of the operation involving the reduction of the sulphur dioxide or the reduction of the sulphate and the reduction of the sulphur dioxide may be conducted simultaneously. Thus, for example, the hydrocarbon and sulphur dioxide may be passed in contact with the sulphate heated to a suitable temperature, and the sulphate will be reduced gradually.

Natural gas which is largely methane and which also contains propane, butane and higher hydrocarbons is a suitable source of hydrocarbon reducing agent both for forming the contact agents and for reducing the sulphur dioxide.

The reaction between the sulphur dioxide and hydrogen sulphide may be carried out by any of the well-known methods, but I prefer to subject the hydrogen sulphide to the action of the sulphur dioxide in the presence of liquid water in thin films. The thin films of liquid water are preferably formed and maintained on the surfaces of granular absorbent materials. For this purpose, I may employ mineral gels such as silica gel, artificial zeolites and iron oxide gel, or, I may employ an insoluble aluminum compound or product such as bauxite, or, a carbonaceous material such as activated charcoal or a natural cellulose product.

The reaction between the sulphur dioxide and the hydrocarbon proceeds satisfactorily at temperatures above 700° C., but a temperature range of about 800° to 850° C. insures a rapid and complete reaction.

The reaction is exothermic and when pure sulphur dioxide gas or gas containing relatively high percentages of sulphur dioxide is employed the reaction will develop sufficient heat to proceed indefinitely without the addition of heat from outside sources. When the gases containing sulphur dioxide are contaminated with nitrogen and products of combustion, however, the heat of the reaction is dissipated by such gases, and it is necessary to provide additional heating means in order to maintain a suitable reaction temperature. Heat may be supplied in any suitable manner. The retort or reaction chamber in which the reaction is conducted may be heated externally or internally by means of a combustion flame or by means of suitable electric resistors, or, the gases entering the reaction chamber may be suitably heated by passing through a heat exchanger in which the gaseous reduction products may provide at least a portion of the heat. When combustion flames are employed the products of combustion may be permitted to come into contact with the reagents within the reaction chamber or not, as desired.

The following example illustrates one of the preferred methods of carrying out the process of my invention:

Sulphur dioxide gases obtained from metal sulphide, smelting or roasting operations and containing, for example, about 8% sulphur dioxide and 4% oxygen, in addition to nitrogen and other inert gases are subjected to a cleaning operation for the purpose of removing dust and other undesirable compounds such, for example, as arsenic compounds and selenium compounds. A portion of the cleaned gases is mixed thoroughly with natural gas and passed through a reaction chamber in contact with a mass of granular calcium sulphide prepared by first dehydrating gypsum ($CaSO_4.2H_2O$) and then subjecting the dehydrated product to the reducing action of a hydrocarbon gas at a temperature in excess of about 600° C. The calcium sulphide contact agent should be heated to a temperature of about 800° C. to 850° C. prior to the introduction of the gas mixture. Sufficient natural gas should be provided to react with the oxygen contained in the sulphur dioxide-bearing gas to produce carbon dioxide and water and to react with the sulphur dioxide according to the following equation:—

(1) $4SO_2 + 3CH_4 = 3CO_2 + 4H_2S + 2H_2O$ 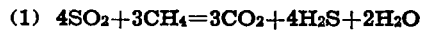

A temperature of about 800° C. to 850° C. is maintained within the reducing chamber during the course of the process. In order to aid in maintaining the desired temperature, the entering gas mixture is passed in heat exchanging relationship with the hot gaseous product of the reducing operation. If the heat exchanging operation is reasonably efficient, the heat contained in the entering gases together with the heat developed by the reaction will be sufficient to maintain the desired temperature within the reaction chamber. If additional heat is required it may be supplied in any suitable manner as, for example, by adding oxygen and a corresponding additional amount of hydrocarbon to the mixture of sulphur dioxide and hydrogen sulphide, by heating the retort by means of an externally applied combustion flame or electrical source of heat, or by providing means in addition to the exit gases for heating the entering gases.

During the course of the reducing operation substantially all of the sulphur dioxide will be reduced to hydrogen sulphide and the operation may be so controlled that the gases issuing from the reaction chamber will be substantially free from sulphur dioxide and elemental sulphur.

The gases issuing from the reaction chamber and containing hydrogen sulphide are cooled by bringing about the heat exchange between them and the gases entering the reaction chamber. The extent to which the gases are permitted to become cooled will be determined normally by the nature and heat requirements of the operation to which they are to be subjected for the production of elemental sulphur. When the hydrogen sulphide of the gaseous reduction product is to be oxidized by means of sulphur dioxide in the presence of water in the liquid state, cooling may be conducted until a temperature not higher than about 60° C. is reached.

The cooled gases containing hydrogen sulphide are mixed with an additional quantity of the cleaned furnace gases containing sulphur dioxide. The proportions of hydrogen sulphide and sulphur dioxide in the mixture should be such as to provide the amounts of such gases which are necessary for carrying out the reaction expressed by the following equation:—

(2) $2H_2S + SO_2 = 2H_2O + 3S$

The mixture of gases is passed through a suitable chamber in contact with one or more granulated absorbent materials such, for example, as artificial zeolite and silica gel on the surfaces of the grains or particles of which films of water in the liquid state are maintained. As the gas is passed through the reaction chamber the reaction expressed by Equation (2) above takes place and elemental sulphur is produced.

A vertical tower in which the granular absorbent material is so disposed as to permit the passage of water and gases therethrough in intimate contact with the granular material may be used advantageously as a reaction chamber.

A spray of water may be introduced into the top or upper portion of the reaction chamber to aid in establishing and maintaining the liquid water films. The water introduced by means of the spray will also function to absorb the heat of the reaction and as a vehicle for carrying away the sulphur produced. Water may be withdrawn constantly from the reaction chamber and it will contain, in suspension, the bulk of the sulphur produced. The sulphur may be separated from the water by filtration, sedimentation or other well-known methods.

The efficiency of the absorbent material contained in the reaction chamber may be reduced eventually sufficiently that its renewal or revivification becomes necessary because of the deposition of sulphur thereon. Sulphur may be separated from the absorbent material by means of steam or water heated to a temperature above the melting point of sulphur.

The interior of the reaction chamber in which the reaction between the sulphur dioxide and hydrogen sulphide is conducted may be maintained at any temperature at which the reaction will proceed satisfactorily. The speed of the reaction may be controlled by controlling the temperature, the speed of reaction varying in accordance with variations in temperature. High temperatures are more conducive to rapid reaction than lower temperatures. Another factor to be considered in determining the temperature at which the operation is to be conducted is the condition in which it is desired to obtain the elemental sulphur produced by the reaction. A temperature above the melting point of elemental sulphur may be employed to produce the elemental sulphur in molten condition, or a temperature below the melting point of elemental sulphur may be employed to obtain elemental sulphur in finely divided solid or semi-plastic condition.

I prefer to carry out the reaction between the sulphur dioxide and the hydrogen sulphide at temperatures above the melting point of elemental sulphur. The temperature may be controlled in any suitable manner but I prefer to regulate the temperature by regulating the temperature of the gas mixture entering the reaction chamber. This may be done by introducing uncooled or partially cooled hydrogen sulphide-bearing gases, or by passing the sulphur dioxide-bearing gases alone or mixed with the hydrogen sulphide-bearing gases through a suitable heat exchanger. In the event that the heat contained in the gaseous hydrogen sulphide-bearing reaction product is used in promoting the reaction between the hydrogen sulphide and sulphur dioxide, it may be necessary to provide heat from a different source for maintaining the reaction between the hydrocarbon and the sulphur dioxide.

In order that water in the liquid state may be maintained in the reaction chamber during the course of the reaction between the sulphur dioxide and the hydrogen sulphide it is essential that the pressure within the reaction chamber be controlled in accordance with the temperature employed. Thus, in operating at temperatures above the melting point of elemental sulphur, I maintain increased pressures which will insure the presence of water in the liquid phase.

I claim:—

1. The method of recovering sulphur which comprises forming a mixture of gases comprising sulphur dioxide and sufficient hydrocarbon to reduce substantially all of the sulphur dioxide to hydrogen sulphide, heating the mixture of gases in the presence of an agent capable of promoting a reaction between the sulphur dioxide and hydrocarbon to produce hydrogen sulphide, and subjecting the hydrogen sulphide produced to the action of an oxidizing agent to produce elemental sulphur.

2. The method of recovering sulphur which comprises forming a mixture of gases comprising sulphur dioxide and sufficient hydrocarbon to reduce substantially all of the sulphur dioxide to hydrogen sulphide, heating the mixture of gases in the presence of an agent capable of promoting a reaction between the sulphur dioxide and hydrocarbon to produce hydrogen sulphide, and subjecting the hydrogen sulphide produced to the action of sulphur dioxide to produce elemental sulphur.

3. The method of recovering sulphur from gas containing sulphur dioxide which comprises mixing a portion of the gas with sufficient hydrocarbon to reduce substantially all of the sulphur dioxide contained therein to hydrogen sulphide, heating the mixture in the presence of an agent capable of promoting a reaction between the sulphur dioxide and hydrocarbon to produce hydrogen sulphide, and subjecting the hydrogen sulphide thus produced to the action of another portion of the gas containing sulphur dioxide to produce elemental sulphur.

4. The method of recovering sulphur from gas containing sulphur dioxide which comprises mixing a portion of the gas with at least sufficient hydrocarbon to reduce all of the sulphur dioxide contained therein to hydrogen sulphide, heating the mixture in the presence of an agent capable of promoting a reaction between the sulphur dioxide and hydrocarbon to produce hydrogen sulphide, and subjecting the hydrogen sulphide thus produced to the action of another portion of the gas containing sulphur dioxide to produce elemental sulphur.

5. The method of recovering sulphur from sulphide ore which comprises heating the ore in an oxidizing atmosphere to produce sulphur dioxide gas, mixing a portion of the gas with sufficient hydrocarbon to reduce substantially all of the sulphur dioxide contained therein to hydrogen sulphide, heating the mixture in the presence of an agent capable of promoting a reaction between the sulphur dioxide and hydrocarbon to produce hydrogen sulphide, and subjecting the hydrogen sulphide thus produced to the action of another portion of the gas containing sulphur dioxide to produce elemental sulphur.

6. The method of recovering sulphur from sulphide ore which comprises heating the ore in an oxidizing atmosphere to produce sulphur dioxide gas, mixing a portion of the gas with at least sufficient hydrocarbon to reduce all of the sulphur dioxide contained therein to hydrogen sulphide, heating the mixture in the presence of an agent capable of promoting a reaction between the sulphur dioxide and hydrocarbon to produce hydrogen sulphide, and subjecting the hydrogen sulphide thus produced to the action of another portion of the gas containing sulphur dioxide to produce elemental sulphur.

7. The method of recovering sulphur which comprises forming a mixture of gases comprising sulphur dioxide and sufficient hydrocarbon to reduce substantially all of the sulphur dioxide to hydrogen sulphide, heating the mixture of gases in the presence of an agent capable of promoting a reaction between the sulphur dioxide and hydrocarbon to produce hydrogen sulphide, and subjecting the hydrogen sulphide produced to the action of sulphur dioxide in the presence of liquid water in the form of thin films to produce elemental sulphur.

8. The method of recovering sulphur from gas containing sulphur dioxide which comprises mixing a portion of the gas with sufficient hydrocarbon to reduce the major portion of the sulphur dioxide contained therein to hydrogen sulphide, heating the mixture in the presence of an agent capable of promoting a reaction between the sulphur dioxide and hydrocarbon to produce hydrogen sulphide, and subjecting the hydrogen sulphide thus produced to the action of another portion of the gas containing sulphur dioxide in the presence of liquid water in the form of thin films to produce elemental sulphur.

9. The method of recovering sulphur which comprises subjecting a quantity of sulphur dioxide to the action of a reducing agent to form a gaseous reaction product containing hydrogen sulphide and substantially free from sulphur dioxide and elemental sulphur, and subjecting the hydrogen sulphide thus produced to the action of an oxidizing agent to form elemental sulphur.

10. The method of recovering sulphur which comprises subjecting a quantity of sulphur dioxide to the action of a reducing agent to form a gaseous reaction product containing hydrogen sulphide and substantially free from sulphur dioxide and elemental sulphur, and subjecting the hydrogen sulphide thus produced to the action of an additional quantity of sulphur dioxide to form elemental sulphur.

11. The method of recovering sulphur which comprises subjecting a quantity of sulphur dioxide to the action of a reducing agent at an elevated temperature to form a gaseous reaction product containing hydrogen sulphide and substantially free from sulphur dioxide and elemental sulphur, cooling the gaseous reaction product, and subjecting the hydrogen sulphide contained in the cooled product to the action of an oxidizing agent to form elemental sulphur.

12. The method of recovering sulphur which comprises subjecting a quantity of sulphur dioxide to the action of a hydrocarbon at an elevated temperature to form a gaseous reaction product containing hydrogen sulphide and substantially free from sulphur dioxide and elemental sulphur, cooling the gaseous reaction product, and subjecting the hydrogen sulphide contained in the cooled product to the action of an additional quantity of sulphur dioxide to form elemental sulphur.

LUDWIG ROSENSTEIN.